United States Patent
Petruzzella et al.

(10) Patent No.: US 12,163,836 B2
(45) Date of Patent: Dec. 10, 2024

(54) MODULAR HOUSING FOR A SPECTROMETER

(71) Applicant: MantiSpectra B.V., Eindhoven (NL)

(72) Inventors: Maurangelo Petruzzella, Eindhoven (NL); Francesco Maria Pagliano, Eindhoven (NL)

(73) Assignee: MantiSpectra B.V. (NL)

( * ) Notice: Subject to any disclaimer, the term of this patent is extended or adjusted under 35 U.S.C. 154(b) by 256 days.

(21) Appl. No.: 17/946,796

(22) Filed: Sep. 16, 2022

(65) Prior Publication Data

US 2023/0081731 A1  Mar. 16, 2023

(30) Foreign Application Priority Data

Sep. 16, 2021 (NL) ...................................... 2029194

(51) Int. Cl.
*G01J 3/02* (2006.01)
(52) U.S. Cl.
CPC ........... *G01J 3/0291* (2013.01); *G01J 3/0202* (2013.01); *G01J 3/0262* (2013.01)
(58) Field of Classification Search
CPC ...... G01J 3/0202; G01J 3/0262; G01J 3/0267; G01J 3/0291
See application file for complete search history.

(56) References Cited

U.S. PATENT DOCUMENTS

| 3,977,786 A | * | 8/1976 | Gast | .................. | G01J 3/453 |
| | | | | | 356/244 |
| 5,754,283 A | | 5/1998 | Keane et al. | | |
| 2015/0247795 A1 | | 9/2015 | Hruska et al. | | |

FOREIGN PATENT DOCUMENTS

| CN | 109238978 A | 1/2019 |
| CN | 213148726 | 5/2021 |
| WO | WO2022061421 | 3/2022 |

* cited by examiner

*Primary Examiner* — Hina F Ayub
(74) *Attorney, Agent, or Firm* — Shumaker, Loop & Kendrick, LLP; Patrick B. Horne

(57) ABSTRACT

A modular housing for a spectrometer, the housing comprising at least two modules, the housing further comprising: a sensor recess configured to receive a sensor, the sensor being configured for determining at least one light spectrum characteristic of light received after optical interaction of the light with a sample; an aperture configured for receiving and guiding the light received after the optical interaction along a reception path extending from an entrance of the aperture to the sensor recess; and at least two channels configured for guiding and emitting light out of the modular housing, such that the light, after the optical interaction with the sample, is received at the entrance of the aperture; wherein the at least two channels are arranged along intersecting or skew axes; and wherein at least two of the at least two modules comprise respective ones of the at least two channels.

30 Claims, 7 Drawing Sheets

MODULAR HOUSING FOR A SPECTROMETER

TECHNICAL FIELD

The present invention relates to a modular housing for a spectrometer and to a method of using such a modular housing.

BACKGROUND

Known housings for spectrometers are built to house a means of emitting light, a means of receiving light and a means of guiding the received light to a suitable sensor.

SUMMARY

However, the above-described approach suffers at least from the problem that such housings only allow for one mode of operation, determined by the way the housing was built and limited by the respective means that it has. This makes it difficult for an operator who desires to determine light spectrum characteristics not only based on the one mode of operation, but also based on other modes of operation. It is therefore required for the operator to move the housing, to move the sample, or even to replace one or more of the built-in means, if he wishes to change the mode of operation.

It is therefore an object of at least some embodiments of the present invention to provide for a housing for a spectrometer that allows for multiple modes of operation.

According to a first aspect of the present invention, there is provided a modular housing for a spectrometer. Note that in this context a "spectrometer" may refer not only to a classical spectrometer adapted for analysing the entire light spectrum, but also may refer to a spectral sensor adapted for analysing only a limited number of channels of the light spectrum, e.g. 16 channels. The housing comprises at least two modules and further comprises the following.

A sensor recess configured to receive a sensor, the sensor being configured for determining at least one light spectrum characteristic of light received after optical interaction of the light with a sample.

An aperture configured for receiving and guiding the light received after the optical interaction along a reception path extending from an entrance of the aperture to the sensor recess. Note that the reception path need not necessarily be straight but may also be curved and/or may be formed of multiple straight segments.

At least two channels configured for guiding and emitting light out of the modular housing, such that the light, after the optical interaction with the sample, is received at the entrance of the aperture.

The at least two channels are arranged along intersecting or skew axes. At least two of the at least two modules comprise respective ones of the at least two channels.

It is an insight of the inventors that providing at least two channels comprised by at least two of the modules allows the housing to function in a modular way, i.e. allows an operator to select and arrange modules according to his requirements, in order to provide a better interplay between the sample being sampled by the spectrometer on the one hand, and the light emission and reception from and in the modular housing on the other hand. Because the at least two channels are arranged along intersecting or skew axes, i.e. axes that are not parallel (nor identical, which is a special case of parallel axes), this allows to analyse the at least one characteristic of the light spectrum stemming from the sample after optical interaction of the light with the sample in a plurality of modes, according to the relationship between the respective channel, the sample, and the aperture.

In some embodiments, the modular housing comprises another aperture configured for receiving and guiding the light received after the optical interaction along another reception path. Preferably, the modular housing also comprises another recess configured to receive another sensor, the other sensor being configured for determining at least one light spectrum characteristic of light received after optical interaction of the light with a sample. In those embodiments, the other reception path extends from an entrance of the other aperture to the sensor recess or to the other recess, if the other recess is present. In this way, multi-modal reception is possible.

Advantageously, this allows to have the spectrometer determine a plurality of light spectrum characteristics based on multiple modes of optical interaction of the light and the sample, e.g. not only direct reflection, but also scattering or other types of optical interactions.

In some embodiments, the at least two channels are configured for:
  containing a respective light source configured for emitting the light; and/or
  coupling with a respective light transmission medium, e.g. an optical fibre, configured for transmitting the light. In this way, the operator can easily choose whether to provide an in-built light source, such as a lamp, a LED (array) or a laser, or any other suitable light source, or whether to couple a light transmission medium such as an optical fibre via the channels to emit from the channels light transmitted via the optical fibre which was originally emitted from another, handier source. Note that it is of course possible to combine both options, which may be extra advantageous if the operator desires to analyse multiple types of light spectrum characteristics simultaneously or at least without having to first decouple one type of light source and then couple another type of light source.

In some embodiments, the modular housing comprises a base and an insert, the insert being one of the at least two modules; wherein the base comprises the sensor recess and an insert recess configured to receive the insert, the insert being complementarily shaped to the insert recess, such that, if the insert is received in the insert recess, the insert faces the sensor recess and, if the sensor is received in the sensor recess, the insert faces the sensor. In this way, the form of the insert can be optimised with regard to holding optical equipment, while the form of the base can be optimised with regard to ease of manipulation, sturdiness, stability, balance, weight, being essentially closed to light, or any other relevant factor.

Note that the insert may be received in the insert recess of the base from any suitable direction, for example from a top of the base downwards but equally from a bottom upwards or from a side sideways.

It is preferred that the insert comprises at least two, preferably exactly two, complementarily-shaped components arranged for being fixated together. In this way, it is easier to allow insertion of any parts into openings of one of the at least two components before said being fixated together.

In some embodiments, if the insert is received in the insert recess, the insert is flush with the base, preferably at a face of the modular housing in which face the entrance of the aperture extends. In this way, it is easier to arrange the sample on that face.

In some embodiments, the modular housing comprises a transverse module, the transverse module comprising:
- at least one channel of the at least two channels, preferably arranged along an axis that is substantially perpendicular to an axis of the reception path, the axis of the reception path being defined at least at the entrance of the aperture; and
- an attachment means configured for attaching the transverse module to the modular housing. In this way, another direction of light emission can be provided in a modular and thus detachable way, namely at a substantially perpendicular axis to the reception path, which would be more difficult from within the body comprising the aperture.

It is preferred that the exit aperture of the perpendicular channel in the insert can be blanked off to close the modular housing to light. In this way, the modular operation is further enhanced, because it can be ensured that channels not in use do not negatively influence the spectrometer.

In some embodiments featuring the insert, the attachment means is configured for attaching the transverse module to the insert. In this way, the transverse module is situated closely to the aperture, to allow for better emission and reception of the light.

In some embodiments, a channel of the at least two channels in the insert comprises an exit aperture and the attachment means is configured for attaching the transverse module to the exit aperture of the said channel. In this way, the attachment means of the transverse module can advantageously be used to block off light from that channel.

In some embodiments, the attachment means comprises a table-shaped foot having at least one prong, and wherein the modular housing comprises a complementarily-shaped foot recess for receiving the at least one prong of the table-shaped foot, for attaching the transverse module to the modular housing. In this way, it is easy to click and unclick the transverse module into and from its place repeatedly.

In some embodiments, the side of the transverse module is at least partially slanted, slanting outwards away from an exit of the at least one channel and preferably slanting outwards towards the attachment means. In this way, it is easier to arrange curved samples, e.g. rounded fruit, in a safe and handy manner.

In some embodiments, the modular housing comprises a cuvette module, the cuvette module comprising:
- at least one channel of the at least two channels;
- a cuvette recess configured for receiving a cuvette; and
- an attachment means configured for attaching the cuvette module to the modular housing;
- wherein the at least one channel of the at least two channels is arranged along an axis extending to the cuvette, if the cuvette is received in the cuvette recess. In this way, the modular housing allows to analyse the light spectrum characteristics of any fluid or fluids in the received cuvette. In this way also, it is possible to provide multi-modal operation for the cuvette, for example by emitting light from one or more channels in another module.

In some embodiments, the cuvette module comprises at least two channels of the at least two channels; at least one of which being arranged along an axis that is substantially perpendicular to an axis of the reception path, the axis of the reception path being defined at least at the entrance of the aperture; and at least one of which being arranged along an axis that is substantially parallel to an axis of the reception path, the axis of the reception path being defined at least at the entrance of the aperture. In this way, it is possible to provide even further multi-modal operation even for the cuvette, namely by emitting or by also emitting light from the at least two channels comprised by the cuvette module.

In some embodiments, the attachment means comprise rails and wherein the modular housing comprises complementarily-shaped rail receivers configured for receiving the rails for attaching the cuvette module to the modular housing. In this way, it is easy to attach and detach the cuvette module.

In some embodiments, the cuvette module comprises at least two holes for fixating the cuvette, if the cuvette is received in the cuvette recess. In this way, screws or any other suitable fixating means can be used to fixate the cuvette to the cuvette module.

In some embodiments, the sensor comprises an array of light detectors configured for detecting distinct regions of the light spectrum.

In some embodiments, the aperture is configured for holding an optical reception assembly along the reception path, the optical reception assembly being configured for manipulating the light received after the optical interaction; and/or the at least two channels comprise at least one optical emission assembly configured for manipulating the light to be emitted out of the modular housing. The optical reception assembly and/or the at least one optical emission assembly preferably comprise at least one lens and/or at least one light filter. In this way, it is possible to manipulate, e.g. focus or filter, the light either before emission, or after reception, or both, in order to improve the optical interaction with the sample, or the operation of the sensor, or both.

Preferably, the optical reception assembly and/or the at least one optical emission assembly comprise a diffuser and/or comprise a non-imaging (also known as anidolic) elements, such as light guides, for example a prism or an array of prisms, mirrors or lenses. In this way, it is possible to reduce any spatial dependence stemming from samples having different shapes but having the same or similar chemical compositions in view of spectrometry.

In some embodiments, the modular housing is essentially closed to light except at the aperture and the at least two channels. In this way, accidental disturbance of the sensor can be reduced or prevented.

In some embodiments, any channel of the at least two channels, if said channel is inactive, is blanked with a blanking plug to prevent light from inadvertently entering the modular housing through said channel.

In some embodiments, at least one channel of the at least two channels is arranged for guiding and emitting light out of the modular housing at a substantially acute angle from the axis of the reception path, the axis of the reception path being defined at least at the entrance of the aperture, in order to diffuse light from the at least one channel, such that the light, when diffused from the sample, is received at the entrance of the aperture. In other words, in this way, there is an acutely-angled channel for emitting light to the sample at an acute angle from the reception path. Note that the reception path can be curved or can be composed of multiple segments, and that therefore in this case the axis of the reception path is defined at least at the entrance of the aperture, i.e. where the reception path starts, thus regardless of whether the reception path curves or zig-zags further along.

In some embodiments, at least one channel of the at least two channels is arranged for guiding and emitting light out of the modular housing along an axis essentially parallel with the axis of the reception path, the axis of the reception path being defined at least at the entrance of the aperture, in order to directly reflect the emitted light onto the sample and back into the aperture. In other words, in this way, there is a straight path for both emitting the light out of the modular housing and receiving the light after the optical interaction with the sample.

In a preferred embodiment, it is possible to combine the aperture with one of the at least two channels, especially when a light transmission medium such as an optical fibre is used with that channel, in order to have the shortest possible path for combined emission and reception.

In some embodiments, the axis along which the light is emitted out of the modular housing and the axis of the reception path are essentially perpendicular to a face of the modular housing, in which face the entrance of the aperture extends.

In some embodiments, the modular housing comprises a wireless module, such as a Bluetooth module, configured for interfacing with the sensor. In a further developed embodiment, the wireless module may be configured for interfacing with the sensor directly, or via a shared-access memory to retrieve any values obtained by the sensor.

In this way, the wireless module allows the operator to easily retrieve the relevant values obtained by the sensor from the spectrometer.

In some embodiments, the modular housing comprises an opening arranged for coupling a communication line to the sensor. In this way, the wireless module allows the operator to easily retrieve the relevant values obtained by the sensor from the spectrometer.

In some embodiments, the opening is further arranged for coupling a power line configured for powering at least one of the following: any respective light source in the at least one channel; and the sensor. In this way, a convenient way of powering the internals of the spectrometer can be provided.

In some embodiments, the communication line and/or the power line are a universal serial bus, USB, line. In this way, an especially convenient way of powering the internals of the spectrometer can be provided.

In some embodiments, the modular housing comprises a battery for powering or for providing power redundancy to at least one of the following: any respective light source in the at least one channel; and the sensor. In this way, the ease of use of the modular housing is further improved, especially for fieldwork.

In some embodiments, the sensor recess is terraced. Note that this means that it is formed of several rectangles of increasing dimension the closer to the direction from which the sensor is inserted into the sensor terrace. In this way, not only can sensors of multiple form factors be accommodated, but also it is easy for a technician installing the sensor to feel his way into the sensor recess.

In some embodiments featuring the base, the base comprises at least two parts, each part comprising complementarily-shaped crenulations for providing a coupling closed to light when coupling the at least two parts.

According to a second aspect of the present invention, there is provided a method of using a modular housing according to any previously-described embodiment to house a spectrometer.

In some embodiments, the at least two channels are used simultaneously to emit light, preferably along at least two respective skew or intersecting axes. In this way, the use is effectively multi-modal in the sense of emitting light in multiple ways.

In some embodiments, when using a modular housing comprising the other aperture, the aperture and the other aperture are used simultaneously to receive light, preferably along at least two respective skew or intersecting axes. In this way, the use is effectively multi-modal in the sense of receiving light in multiple ways

BRIEF DESCRIPTION OF THE DRAWINGS

Exemplary embodiments will now be described in more detail, with reference to the following appended drawings.

DETAILED DESCRIPTION

Exemplary embodiments will now be described in more detail, with reference to the appended drawings. Note that the present invention should not be construed as limited to these exemplary embodiments, which serve only to help the skilled person to better understand the scope of the present invention.

Figure 1:
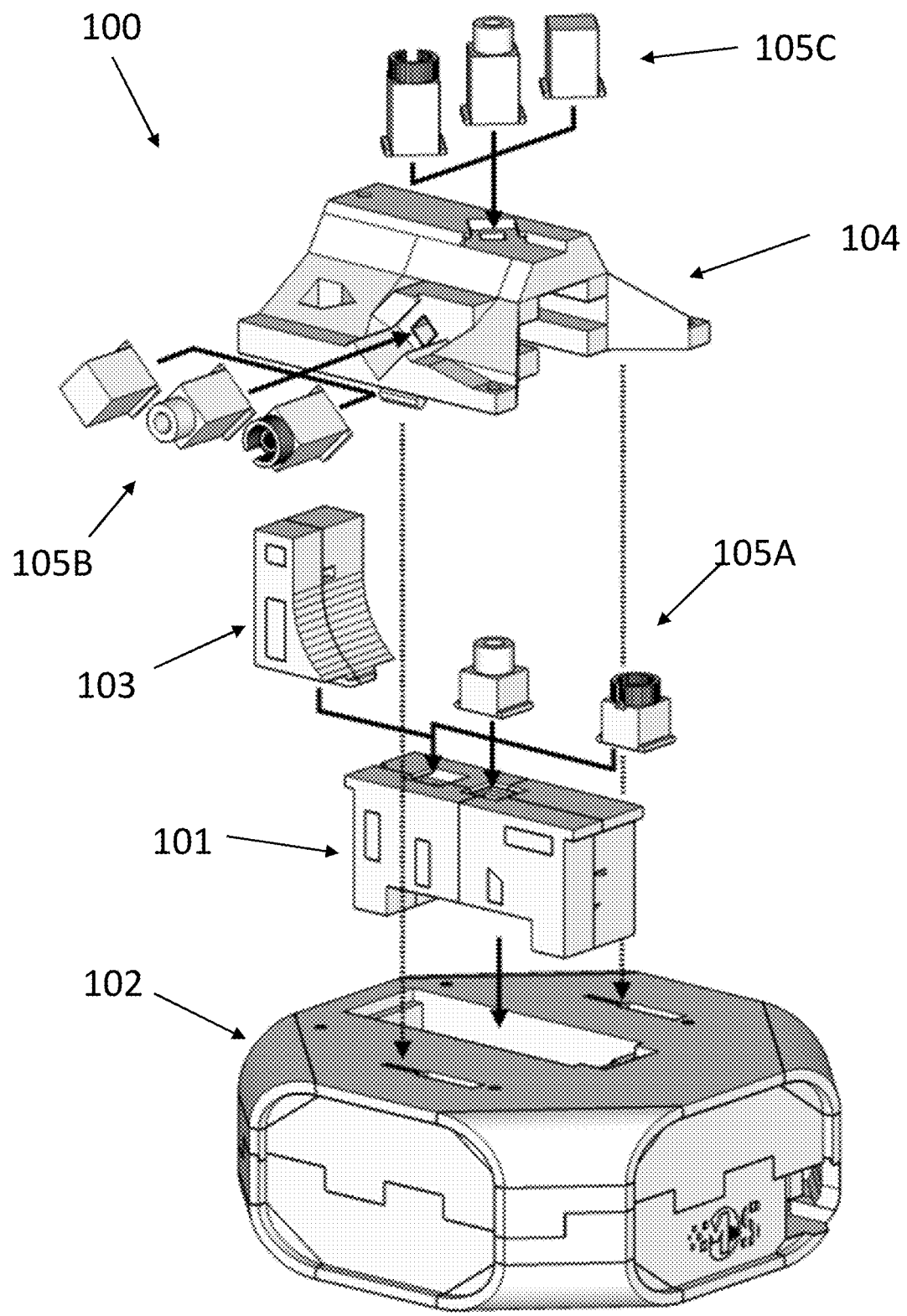
FIG. 1 schematically illustrates an embodiment of the modular housing according to the present invention, in perspective view.

FIG. 1 schematically illustrates an embodiment of the modular housing 100 according to the present invention, in perspective view. The figure shows a base 102, an insert 101, a transverse module 103, a cuvette module 104, and some sets of plugs 105A-C, including a blanking plug (shown as a beam-shaped blank cap) for blocking off an opening and two coupling plugs for coupling with an optical fibre or another type of light transmission medium (not shown). Of course, this figure strives to show many modules together at the same time, and of course it is not necessary to use all modules at the same time. The details of the modules will be described more elaborately with reference to the figures below, but it is already clear from FIG. 1 how the insert 101 can be inserted into an insert recess in the base 102, that the transverse module 103 can optionally be attached to the insert 101 or that alternatively one or both of the plugs 105A can be attached instead, that optionally one of the plugs 105A can be attached to the aperture of the insert 101, that the cuvette module 104 can be attached to the base 102, and that optionally one of the plugs 105B can be used, e.g. the blanking plug to block off one of the channels of the cuvette module 104 or the coupling plug to couple with an optical fibre, and/or one of the plugs 105C can be used, e.g. the blanking plug to block off the other channel of the cuvette module 104 or the coupling plug to couple with an optical fibre.

Figure 2:
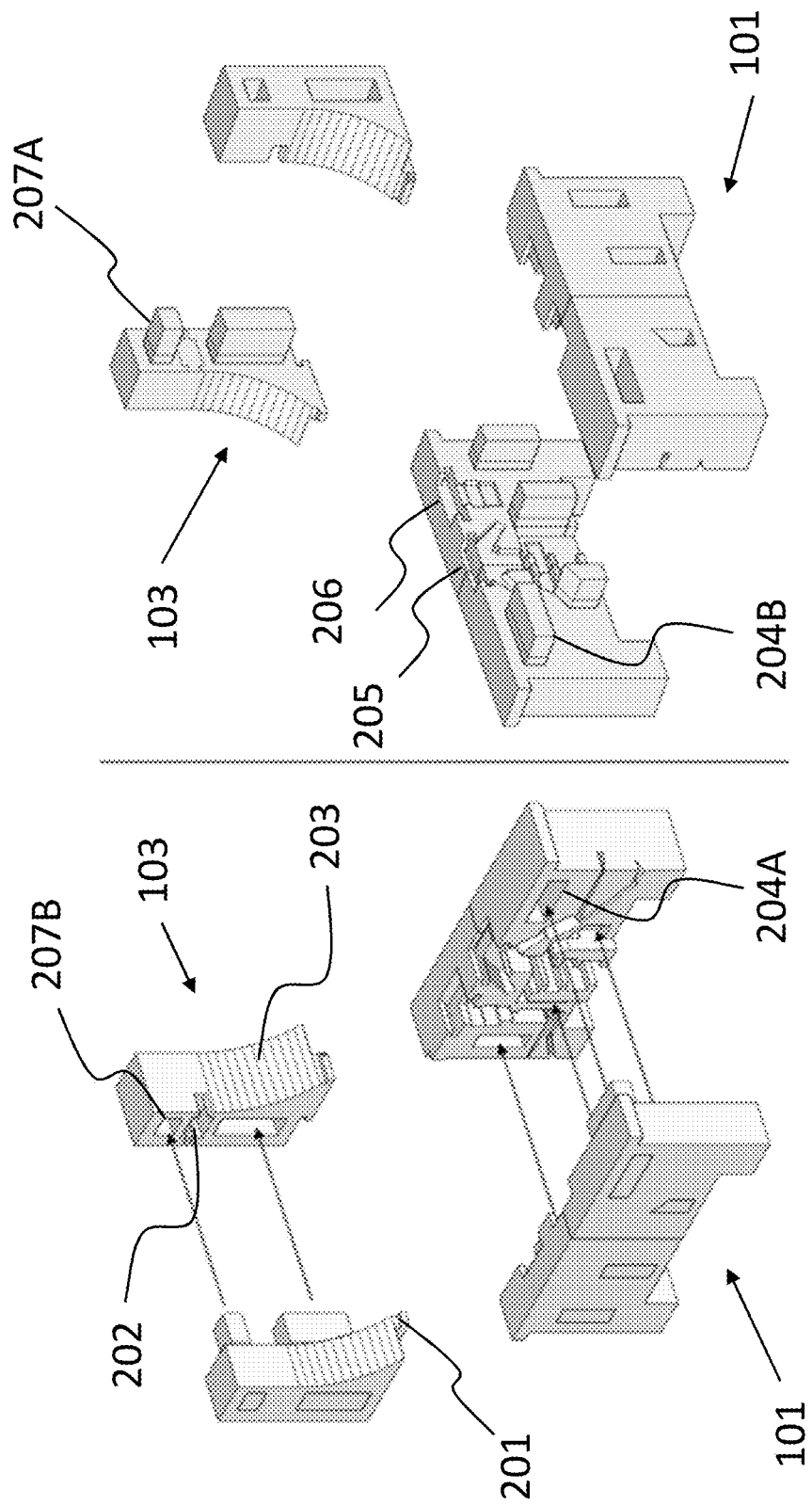
FIG. 2 schematically illustrates in more detail a transverse module and an insert of the modular housing according to the present invention, in two perspective views.

FIG. 2 schematically illustrates in more detail a transverse module 103 and an insert 101 of the modular housing 100 according to the present invention, in two perspective views. The figure shows on the left bottom a first perspective of the insert 101, on the right bottom a second perspective of the same insert 101, on the left top a first perspective of the transverse module 103, and on the right top a second perspective of the same transverse module 103.

The transverse module 103 may comprise a channel 202 for guiding and emitting light out of the modular housing 100, such that the light, after the optical interaction with the sample, is received at the entrance of the aperture. The transverse module 103 may comprise an attachment means 201, in this example a table-shaped foot, which can be attached to an exit aperture 206 of insert 101 by clicking it into place, so the prongs of the attachment means 201 snap into place in complementarily-shaped recesses of the exit aperture 206. The figure further shows that the transverse module 103 may comprise a slanted face, which slants increasingly starting from near the channel 202 outwards to the attachment means 201. The figure further shows that the transverse module 103 may comprise one or more protuberances, e.g. protuberance 207A, as well as one or more corresponding protuberance recesses, e.g. protuberance recess 207B, which may be coupled to increase the structural rigidity of the transverse module 103.

The channels, such as channel 202 may be configured for containing a respective light source, such as a lamp or a LED or a laser, for emitting the light, and/or for coupling with a respective light transmission medium, such as an optical fibre, which is configured for transmitting the light.

Figure 5:
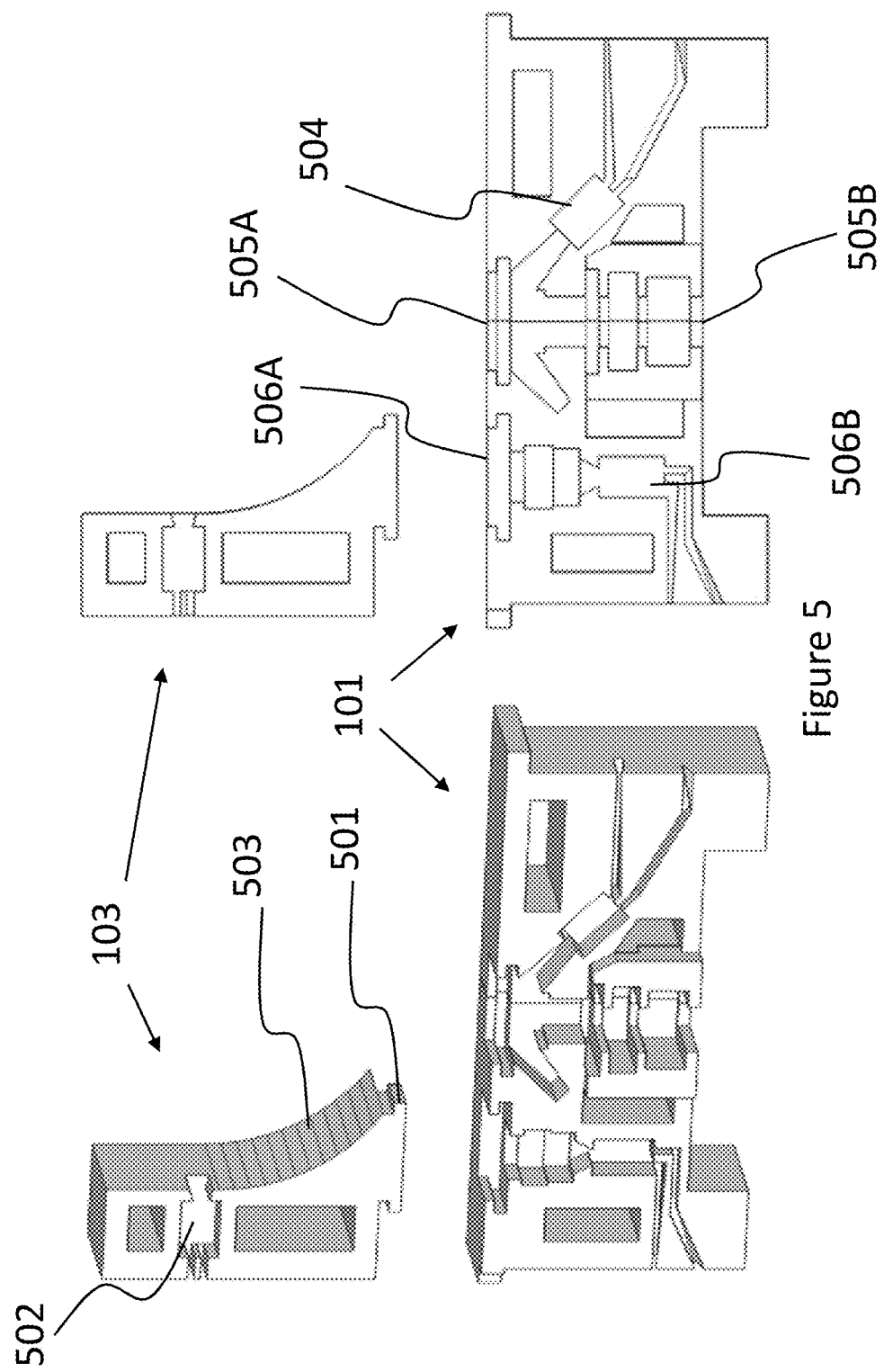
FIG. 5 schematically illustrates in more detail parts of the transverse module and the insert of the embodiment of FIG. 2, in a different perspective view as well as in face view.

The insert 101 may comprise an aperture 205, as will become more readily apparent with reference to FIG. 5, as well as at least one channel, in this example two channels. Of one of those channels, its exit aperture 206 is indicated, with reference to the attachment means 201 of the transverse module 103. The figure also shows that the insert 101 may comprise one or more protuberances, e.g. protuberance 204B, as well as one or more corresponding protuberance recesses, e.g. protuberance recess 204A, which may be coupled to increase the structural rigidity of the insert 101.

Note that it is of course possible to use the insert without the transverse module, preferably using a blanking plug to block off the corresponding channel. It is of course possible to provide an analogous attachment means to the blanking plug, to click it into the exit aperture 206 in the same manner.

Note also that the different channels are arranged along intersecting or skew axes, and that at least two of the modules comprise respective ones of the at least two channels, thus distributing the modular operation over the multiple modules.

Figure 3:
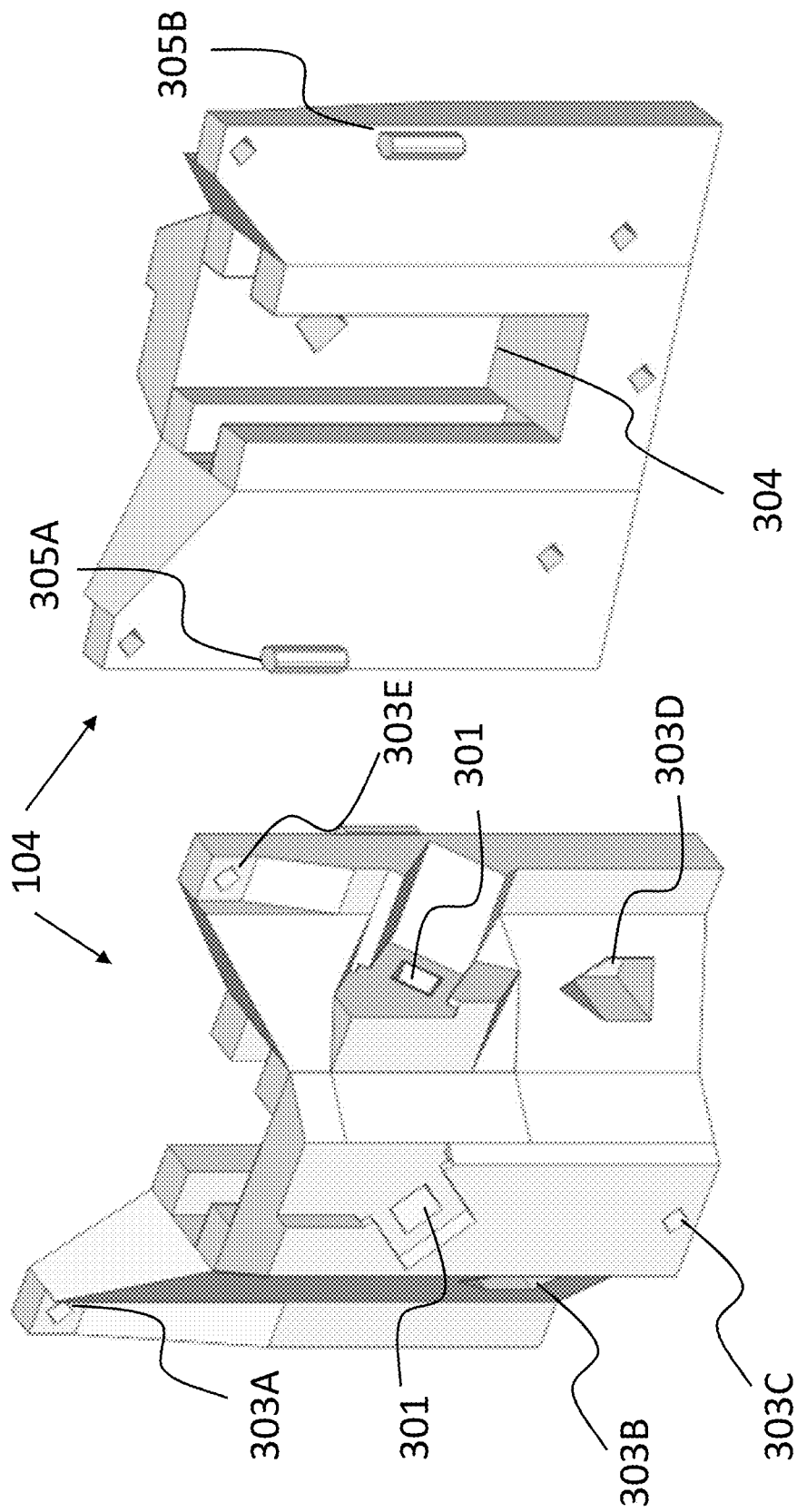
FIG. 3 schematically illustrates in more detail a cuvette module of the modular housing according to the present invention, in two different perspective views.

FIG. 3 schematically illustrates in more detail a cuvette module 104 of the modular housing 100 according to the present invention, in two different perspective views. The cuvette module 104 may comprise one or more, in this example two, channels 301 for guiding and emitting light out of the modular housing 100, such that the light, after the optical interaction with the sample, is received at the entrance of the aperture. It can be seen that at least one of the channels is arranged along an axis that is substantially perpendicular to an axis of the reception path, the axis of the reception path being defined at least at the entrance of the aperture; and at least one of the channels is arranged along an axis that is substantially parallel to an axis of the reception path, the axis of the reception path being defined at least at the entrance of the aperture.

The cuvette module 104 may also comprise a cuvette recess 304 for receiving the cuvette. For the sake of clarity, the cuvette itself is not shown, but the skilled person knows how to provide standard cuvettes for this purpose. The cuvette module 104 may also comprise rails 305A-B, shaped complementarily to be received in rail receivers (not shown) situated elsewhere in the modular housing 100, preferably in the base 102, in order to be coupled securely. The cuvette module 104 may also comprise one or more, in this example five, holes 303A-E for fixating the cuvette, e.g. with screws.

Figure 4:
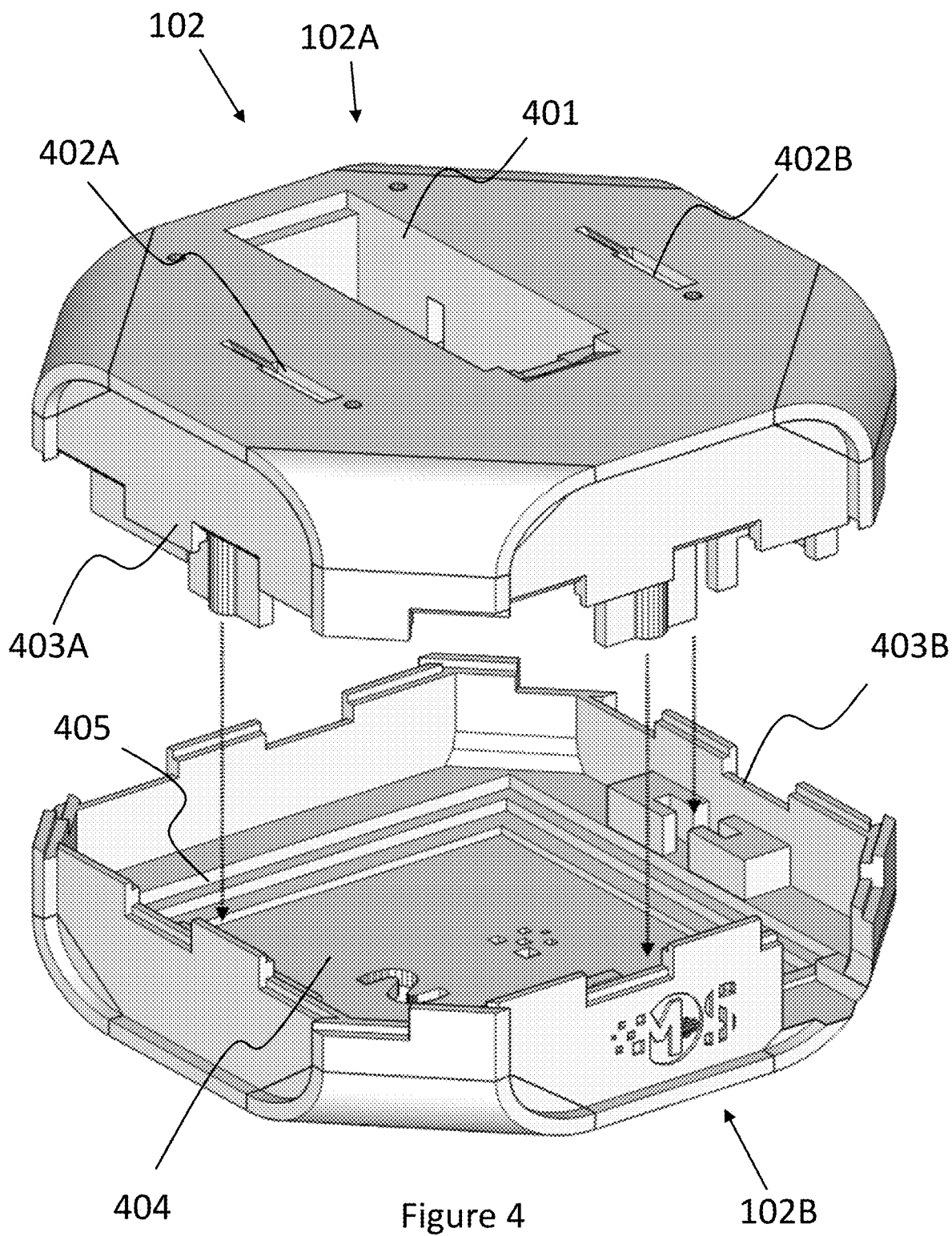
FIG. 4 schematically illustrates in more detail a base of the modular housing according to the present invention, in exploded perspective view.

FIG. 4 schematically illustrates in more detail a base 102 of the modular housing 100 according to the present invention, in exploded perspective view. The base 102 may comprise several, in this example two, components, in this example a top component 102A and a bottom component 102B, shaped complementarily to each other. The base 102 may comprise an insert recess 401, into which an insert (not shown in this figure) may be received, e.g. insert 101 of FIG. 1. In this way, if the insert 101 is received in the insert recess 401, the insert faces the sensor recess 404 and, if the sensor is received in the sensor recess 404, the insert 101 faces the sensor.

Note that the sensor is not shown in the figure, but may preferably be a sensor array of light detectors configured for detecting distinct regions of the light spectrum.

The figure also shows that the base may comprise rail receivers 402A-B, as were described with reference to FIG. 3, in order to receive the rails 305A-B of the cuvette module 104. The base 102 may further comprise a sensor recess 404, which may preferably be terraced 405. The base 104 may further comprise crenulations 403A-B, which are shaped complementarily in order to better block off light from entering the base 102.

Moreover, it can be seen from FIG. 4 that, when the insert 101 is received in the insert recess 401, the insert 101 is flush with the base 102, i.e. they each have a respective side that is aligned with the other's respective side.

FIG. 5 schematically illustrates in more detail parts of the transverse module 103 (top of the figure) and the insert 101 (bottom of the figure) of the embodiment 100 of FIG. 2, in a different perspective view (left side of the figure) as well as in face view (right side of the figure).

The transverse module 103 may comprise a channel 502 for guiding and emitting light out of the modular housing 100 and towards a sample (not shown), such that the light, after the optical interaction with the sample, is received at the entrance of the aperture 505A of the insert 101. The channel 502 may be arranged along an axis that is substantially perpendicular to an axis of the reception path, the axis of the reception path being defined at least at the entrance 505A of the aperture 505A-B.

The transverse module 103 may comprise an attachment means 501, in this example a table-shaped foot, which can be attached to an exit aperture 506A of a channel insert 101 by clicking it into place, so the prongs of the attachment means 501 snap into place in complementarily-shaped recesses of the exit aperture 506A. The figure further shows that the transverse module 103 may comprise a slanted face, as explained with reference to FIG. 2.

The figure further shows that the transverse module 103 may comprise one or more corresponding protuberance recesses (shown as empty, closed-off, rectangular recesses), which may be coupled with one or more protuberances to increase the structural rigidity of the transverse module 103, as was explained with reference to FIG. 2.

The insert 101 may comprise an aperture 505A-B, configured for receiving and guiding the light received after optical interaction of the light with the sample along a reception path extending from an entrance of the aperture—i.e. at its end indicated with reference 505A—to the sensor recess 404 of base 102 (not shown)—i.e. in the direction of its end indicated with reference 505B, as well as at least one channel, in this example two channels, namely channel 506B and channel 504. Of one of those channels, its exit aperture 506A is indicated, with reference to the attachment means 501 of the transverse module 103. The figure also shows that the insert 101 may comprise one or more corresponding protuberance recesses (again shown as empty, closed-off, rectangular recesses), which may be coupled with one or more protuberances to increase the structural rigidity of the insert 101.

The figure shows that the aperture 505A-B extends along a substantially straight axis from 505A to 505B. However, it is of course possible to alter the relative position of the elements by using e.g. light guides (such as optical fibres) or mirrors or deflecting lenses, to have a reception path that is not straight, but is curved or is composed of multiple straight segments at an angel to each other. The skilled person will understand that this can be implemented without undue burden, by also altering the position of the one or more channels if necessary, and by also altering the position of the sensor recess 404 of base 102 if necessary.

The figure further shows that one of the two channels, namely channel 504 is arranged for guiding and emitting light out of the modular housing 100 at a substantially acute angle from the axis of the reception path, the axis of the reception path being defined at least at the entrance 505A of the aperture, in order to diffuse light from the channel 504, such that the light, when diffused from the sample, is received at the entrance of the aperture 505A. In other words, channel 504 is acutely-angled compared to the axis of the aperture 505A-B, for emitting light to the sample at an acute angle from the reception path. Note that the reception path can be curved or can be composed of multiple segments, and that therefore in this case the axis of the reception path is defined at least at the entrance 505A of the aperture, i.e. where the reception path starts, thus regardless of whether the reception path curves or zig-zags further along, so even if the end 505B of the aperture would be situated at a different position.

On the other hand, the figure also shows that the other of the two channels, namely channel 506B is arranged for guiding and emitting light out of the modular housing 100 along an axis essentially parallel with the axis of the reception path, the axis of the reception path being defined at least at the entrance 505A of the aperture, in order to directly reflect the emitted light onto the sample and back into the aperture 505A-B. In other words, channel 506B provides a straight path for emitting the light out of the modular housing 100, and in this example aperture 505A-B provides a straight path for receiving the light after the optical interaction with the sample.

It is noted that in the context of the present disclosure, the term "essentially" is taken to mean "the same or as nearly the same as to make no technically effective difference in practical circumstances" and may in particular examples be interpreted as "being within 10%, preferably within 1%, more preferably within 0.1%, of". Therefore, for example, "an essentially parallel" set of axes may refer to axes at an angle within 10%, preferably within 1%, more preferably within 0.1% of 0 degrees, as considered from 90 degrees. Also, it is noted that in the context of the present disclosure, the term "substantially" is taken to mean that a quality is predominantly present, which may still be the case near the endpoints of a range of that quality even if the actual endpoints of that range are excluded. For example, "a substantially acute angle" may refer to any angle in the range of 0.01 degrees to 89.99 degrees, or more realistically, in the range of 1 degree to 89 degrees, or more practically, in the range of 10 degrees to 80 degrees.

By providing both channels, the modular housing 100 allows multiple modes of operation. By simultaneously using both channels to emit light, it is moreover possible to use the multiple modes of operation simultaneously.

The modular housing 100 may further comprise an optical reception assembly (not shown) in the aperture 505A-B, e.g. comprising respectively from reference 505A to reference 505B the following: an optional protective cap, for example made of glass, an optical filter designed to cut visible wavelengths from the light spectrum of the received light, a diffuser to homogenize the received light, and a focusing lens for preferably anidolically focusing the received light onto the sensor. Thus, the optical reception assembly allows to manipulate the light to be received after the optical interaction with the sample.

The modular housing 100 may further comprise at least one optical emission assembly (not shown) in the channels 504 and/or 506B, e.g. comprising respectively, from an end remote from the face of the modular housing 100 in which the entrance 505A of the aperture extends to an end in or near that face, the following: a lamp or another light source, and one or more lenses, especially for coupling the channel with a light transmission medium such as an optical fibre. Thus, the optical emission assembly allows to manipulate the light to be emitted out of the modular housing 100.

In a further developed embodiment, the optical reception assembly and/or the at least one optical emission assembly may comprise a diffuser and/or comprise a non-imaging (also known as anidolic) elements, such as light guides, for example a prism or an array of prisms, mirrors or lenses. In this way, it is possible to reduce any spatial dependence stemming from samples having different shapes but having the same or similar chemical compositions in view of spectrometry.

Note that channel 504, being slanted or tilted, may advantageously be used for reflectance excitation of and light diffusion on the sample, whereas channel 506B, being arranged essentially in parallel with the reception path, may advantageously be used for interactance measurements with the sample. On that topic, note also that channel 502 of the transverse module 103 may advantageously be used for lateral excitation of the sample.

Note that it is of course possible to use the insert without the transverse module, preferably using a blanking plug to block off the corresponding channel. It is of course possible to provide an analogous attachment means to the blanking plug, to click it into the exit aperture 506A in the same manner.

Figure 6:
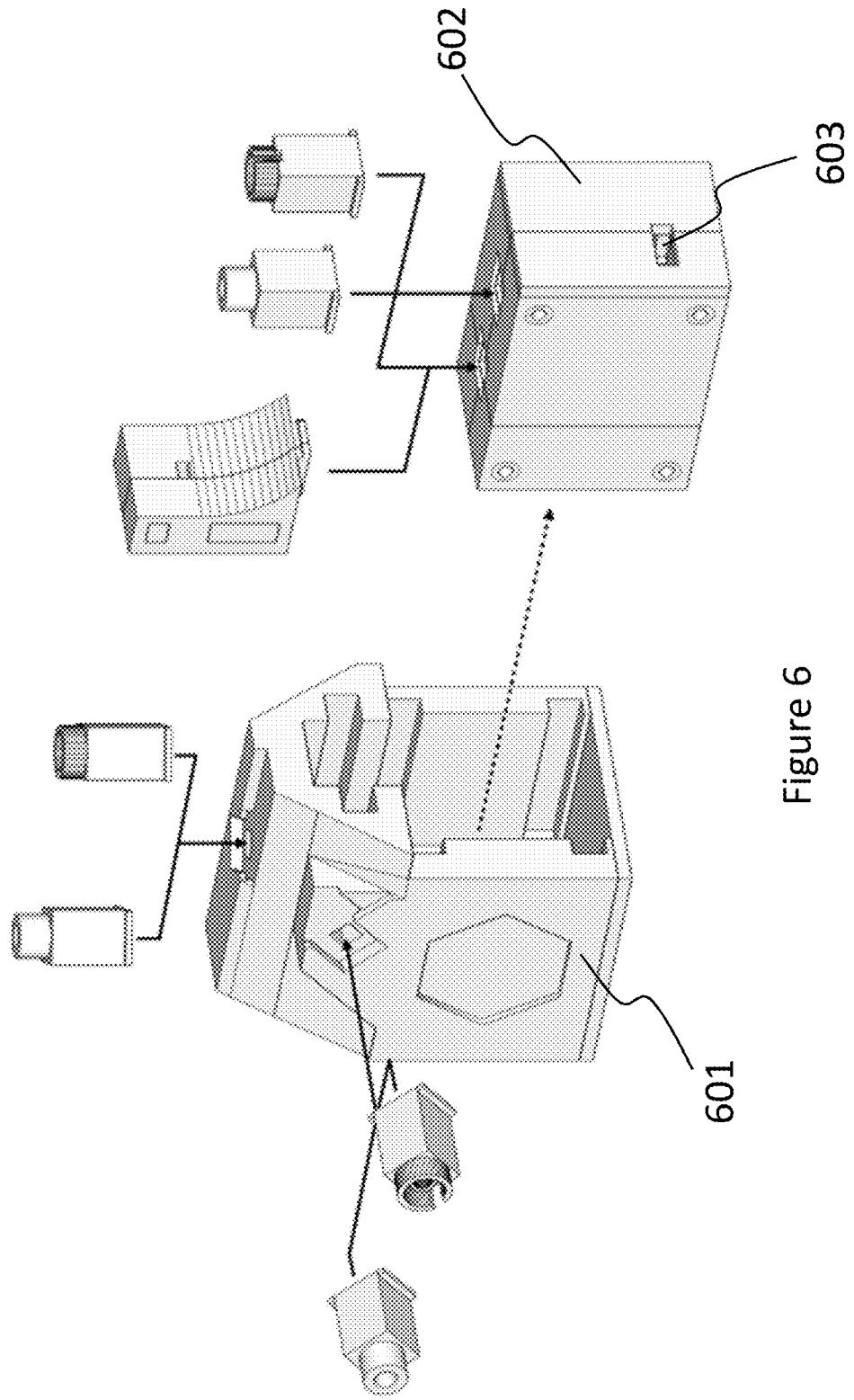
FIG. 6 schematically illustrates another embodiment of a modular housing according to the present invention, in perspective view.

FIG. 6 schematically illustrates another embodiment of a modular housing according to the present invention, in perspective view. In this embodiment, instead of a large base 102 and an insert 104, a smaller base 601 may be used, with a standalone insert 602, which is shaped complementarily to the base 601. The insert 602 may be termed standalone because it comprises its own sensor recess, as will be described below with reference to FIG. 7. To this end, the insert 602 may also comprise an opening 603, for feeding power to the sensor (when present) and optionally for interfacing with the sensor in order to communicate about values obtained by the sensor. Of course, and as is shown in the figure, all other modules, such as the cuvette module and the transverse module, as well as the plugs, may be used in conjunction with this embodiment as well.

Figure 7:
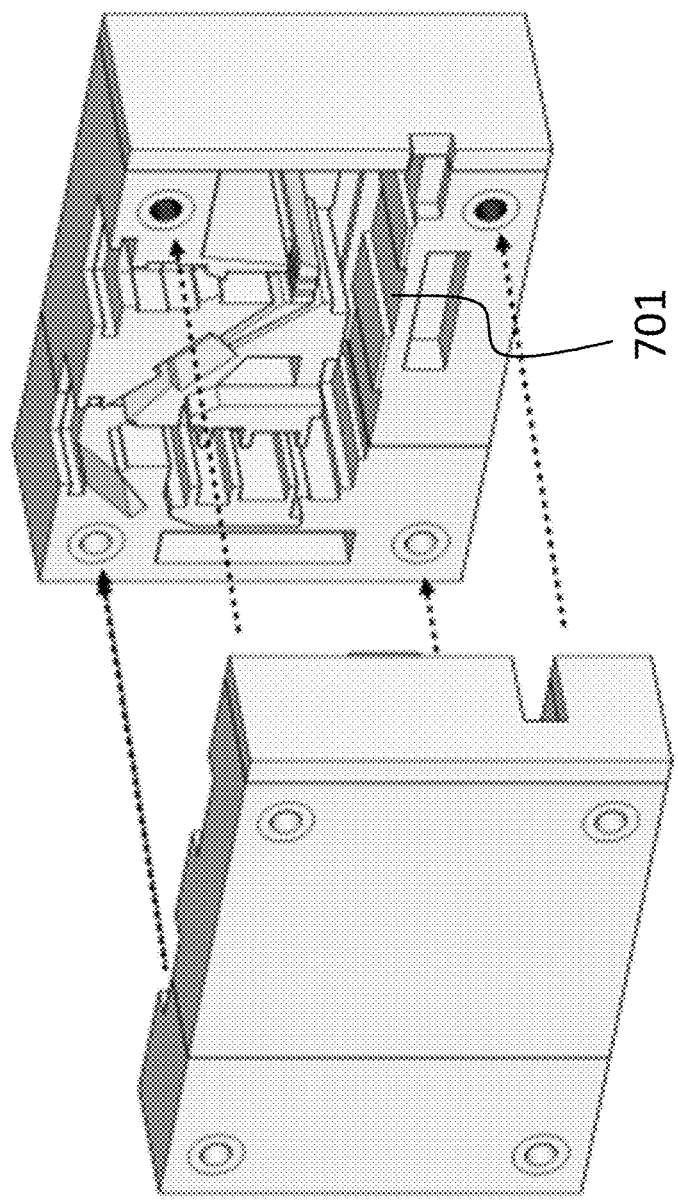
FIG. 7 schematically illustrates in more detail a part of the modular housing shown in FIG. 6, in exploded perspective view.

FIG. 7 schematically illustrates in more detail a part of the modular housing shown in FIG. 6, in exploded perspective view. The part shown is the same insert as shown in FIG. 6, with analogous internals as were described above with reference to FIG. 5, but also comprising a sensor recess 701, configured to receive the sensor, instead of having the sensor be received in the base. To this end, the insert of FIG. 7 is closed off at its bottom, i.e. at its side where the sensor is received, i.e. the side away from the aperture. However, if the light received into the modular housing after optical interaction is guided along an optical path that is not straight from the entrance of the aperture to the other side of the insert, this may of course be adapted accordingly, in which case the insert of FIG. 7 would be closed off at that side.

The invention claimed is:

1. A modular housing for a spectrometer, the housing comprising at least two modules, the housing further comprising:
   a sensor recess configured to receive a sensor, the sensor being configured for determining at least one light spectrum characteristic of light received after optical interaction of the light with a sample;
   an aperture configured for receiving and guiding the light received after the optical interaction along a reception path extending from an entrance of the aperture to the sensor recess; and
   at least two channels configured for guiding and emitting light out of the modular housing, such that the light, after the optical interaction with the sample, is received at the entrance of the aperture;
   wherein the at least two channels are arranged along intersecting or skew axes; and
   wherein at least two of the at least two modules comprise respective ones of the at least two channels.

2. The modular housing of claim 1, comprising another aperture configured for receiving and guiding the light received after the optical interaction along another reception path;
   and preferably comprising another recess configured to receive another sensor, the other sensor being configured for determining at least one light spectrum characteristic of light received after optical interaction of the light with a sample;
   wherein the other reception path extends from an entrance of the other aperture to the sensor recess or to the other recess.

3. The modular housing of claim 1, wherein the at least two channels are configured for:
   containing a respective light source configured for emitting the light; and/or
   coupling with a respective light transmission medium, e.g. an optical fibre, configured for transmitting the light.

4. The modular housing of claim 1, comprising a base and an insert, the insert being one of the at least two modules;
   wherein the base comprises the sensor recess and an insert recess configured to receive the insert, the insert being complementarily shaped to the insert recess, such that, if the insert is received in the insert recess, the insert faces the sensor recess and, if the sensor is received in the sensor recess, the insert faces the sensor.

5. The modular housing of claim 4, wherein, if the insert is received in the insert recess, the insert is flush with the base, preferably at a face of the modular housing in which face the entrance of the aperture extends.

6. The modular housing of claim 4, comprising a transverse module, the transverse module comprising:
   at least one channel of the at least two channels, preferably arranged along an axis that is substantially perpendicular to an axis of the reception path, the axis of the reception path being defined at least at the entrance of the aperture; and
   an attachment means configured for attaching the transverse module to the modular housing.

7. The modular housing of claim 6, wherein the attachment means is configured for attaching the transverse module to the insert.

8. The modular housing of claim 6, wherein a channel of the at least two channels in the insert comprises an exit aperture and wherein the attachment means is configured for attaching the transverse module to the exit aperture of the said channel.

9. The modular housing of claim 6, wherein the attachment means comprises a table-shaped foot having at least one prong, and wherein the modular housing comprises a complementarily-shaped foot recess for receiving the at least one prong of the table-shaped foot, for attaching the transverse module to the modular housing.

10. The modular housing of claim 6, wherein the side of the transverse module is at least partially slanted, slanting outwards away from an exit of the at least one channel and preferably slanting outwards towards the attachment means.

11. The modular housing of claim 6, further comprising a cuvette module, the cuvette module comprising:
    at least one channel of the at least two channels;
    a cuvette recess configured for receiving a cuvette; and
    an attachment means configured for attaching the cuvette module to the modular housing;
    wherein the at least one channel of the at least two channels is arranged along an axis extending to the cuvette, if the cuvette is received in the cuvette recess.

12. The modular housing of claim 11, wherein the cuvette module comprises at least two channels of the at least two channels; at least one of which being arranged along an axis that is substantially perpendicular to an axis of the reception path, the axis of the reception path being defined at least at the entrance of the aperture; and at least one of which being arranged along an axis that is substantially parallel to an axis of the reception path, the axis of the reception path being defined at least at the entrance of the aperture.

13. The modular housing of claim 11, wherein the attachment means comprise rails and wherein the modular housing comprises complementarily-shaped rail receivers configured for receiving the rails for attaching the cuvette module to the modular housing.

14. The modular housing of claim 11, wherein the cuvette module comprises at least two holes for fixating the cuvette, if the cuvette is received in the cuvette recess.

15. The modular housing of claim 1, wherein the sensor comprises an array of light detectors configured for detecting distinct regions of the light spectrum.

16. The modular housing of claim 1, wherein the aperture is configured for holding an optical reception assembly along the reception path, the optical reception assembly being configured for manipulating the light received after the optical interaction; and/or wherein the at least two channels comprise at least one optical emission assembly configured for manipulating the light to be emitted out of the modular housing;

wherein the optical reception assembly and/or the at least one optical emission assembly preferably comprise at least one lens; at least one light filter; at least one diffuser; and/or at least one non-imaging element.

17. The modular housing of claim 1, wherein the modular housing is essentially closed to light except at the aperture and the at least two channels.

18. The modular housing of claim 17, wherein any channel of the at least two channels, if said channel is inactive, is blanked with a blanking plug to prevent light from inadvertently entering the modular housing through said channel.

19. The modular housing of claim 1, wherein at least one channel of the at least two channels is arranged for guiding and emitting light out of the modular housing at a substantially acute angle from the axis of the reception path, the axis of the reception path being defined at least at the entrance of the aperture, in order to diffuse light from the at least one channel, such that the light, when diffused from the sample, is received at the entrance of the aperture.

20. The modular housing of claim 1, wherein at least one channel of the at least two channels is arranged for guiding and emitting light out of the modular housing along an axis essentially parallel with the axis of the reception path, the axis of the reception path being defined at least at the entrance of the aperture, in order to directly reflect the emitted light onto the sample and back into the aperture.

21. The modular housing of claim 20, wherein the axis along which the light is emitted out of the modular housing and the axis of the reception path are essentially perpendicular to a face of the modular housing, in which face the entrance of the aperture extends.

22. The modular housing of claim 1, comprising an opening arranged for coupling a communication line to the sensor.

23. The modular housing of claim 22, wherein the opening is further arranged for coupling a power line configured for powering at least one of the following: any respective light source in the at least one channel; and the sensor.

24. The modular housing of claim 22, wherein the communication line and/or the power line are a universal serial bus, USB, line.

25. The modular housing of claim 1, comprising a battery for powering or for providing power redundancy to at least one of the following: any respective light source in the at least one channel; and the sensor.

26. The modular housing of claim 1, wherein the sensor recess is terraced.

27. The modular housing of claim 1, when dependent on claim 4, wherein the base comprises at least two parts, each part comprising complementarily-shaped crenulations for providing a coupling closed to light when coupling the at least two parts.

28. A method of using a modular housing according to claim 1 to house a spectrometer.

29. The method of claim 28, wherein the at least two channels are used simultaneously to emit light, preferably along at least two respective skew or intersecting axes.

30. The method of claim 29, when using a modular housing according to a claim 2, the modular housing comprising the other aperture, wherein the aperture and the other aperture are used simultaneously to receive light, preferably along at least two respective skew or intersecting axes.

* * * * *